United States Patent [19]

Fenwick

[11] Patent Number: 4,693,383
[45] Date of Patent: Sep. 15, 1987

[54] MERCHANDISING RACK

[75] Inventor: Jay G. Fenwick, Albert Lea, Minn.

[73] Assignee: Joyce International, Inc., Great Neck, N.Y.

[21] Appl. No.: 722,621

[22] Filed: Apr. 12, 1985

[51] Int. Cl.$^4$ ............................................. A47B 47/00
[52] U.S. Cl. ...................................... 211/192; 211/184;
211/189; 108/61; 248/188.2; 312/111; 403/298;
403/254; 403/397
[58] Field of Search ............... 211/192, 189, 187, 184,
211/186, 153, 194, 123; 40/16.2, 574; 108/146,
110, 111, 106, 107, 61, 91; 312/111, 257 A;
160/263; 49/380; 248/188.2, DIG. 9, 677;
280/79.1 R, 79.1 A, 79.3, 47.13; 403/298, 292,
397, 297, 254, 396, 255, 253, 398

[56] References Cited

U.S. PATENT DOCUMENTS

| | | | |
|---|---|---|---|
| 598,365 | 2/1898 | Derby | 211/184 |
| 2,132,316 | 10/1938 | Newton | 280/79.1 X |
| 2,532,370 | 10/1970 | Fenwick | 403/254 X |
| 2,595,016 | 4/1952 | Spector et al. | 49/380 X |
| 2,839,203 | 6/1958 | Becker | 211/184 |
| 2,874,971 | 2/1959 | Devery | 248/188.2 X |
| 2,877,875 | 3/1959 | Bolt | 248/188.2 X |
| 3,154,028 | 10/1964 | Hamilton | 211/184 X |
| 3,458,052 | 7/1969 | Kann | 403/255 X |
| 3,506,138 | 4/1970 | Travis | 108/91 |
| 3,601,432 | 8/1971 | Fenwick et al. | 211/192 X |
| 3,610,427 | 10/1971 | Maziarka et al. | 211/123 |
| 3,835,354 | 9/1974 | Torres-Pena | 312/111 X |
| 4,106,738 | 8/1978 | Kostecky | 211/192 X |
| 4,133,433 | 1/1979 | Wolf | 403/255 X |
| 4,135,837 | 1/1979 | Suttles | 211/189 X |
| 4,173,934 | 11/1979 | Searby | 108/111 |

FOREIGN PATENT DOCUMENTS 1493713  9/1967  France ............................ 403/298

Primary Examiner—Ramon S. Britts
Assistant Examiner—Blair M. Johnson

[57] ABSTRACT

A cigarette carton merchandising rack assembly is disclosed. A plurality of uprights are connected by transverse tie braces and base plates to form a rack module. Each of the tie braces includes a cam lock assembly and each of the base plates has a locking key that facilitate positive securement of the uprights, tie braces and base plates to form each rack module. Shelves are removably carried by the uprights and include ticket support surfaces. Several of the individual rack modules can be joined to each other to form a rack assembly that provides maximum floor space usage. Various heights adjusting assemblies, leg levelers and caster wheel mounting devices which are usable with the merchandising rack module to increase the overall flexibility of the module are disclosed.

34 Claims, 35 Drawing Figures

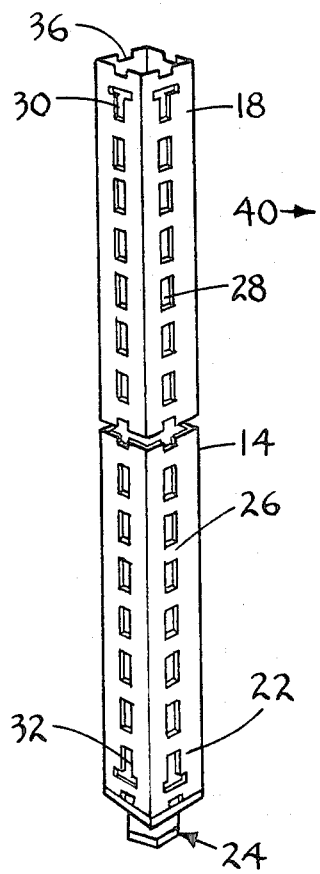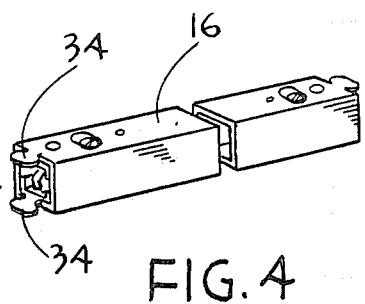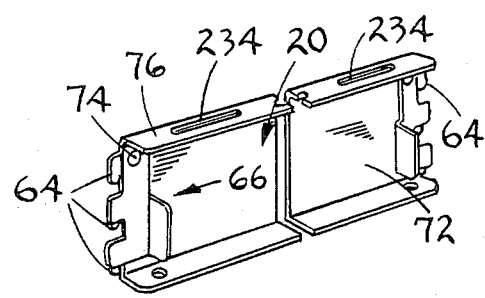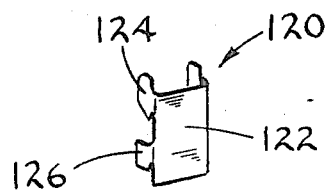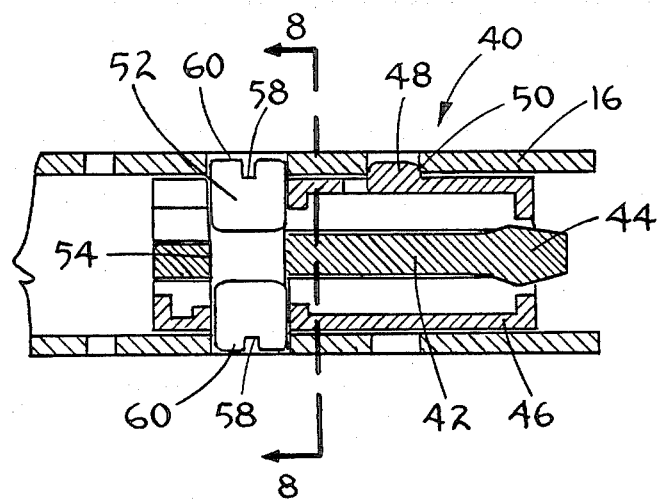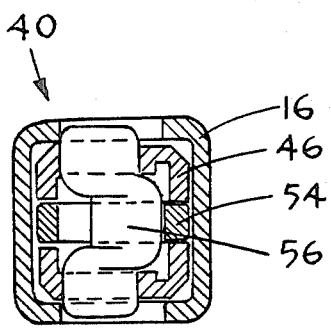

MERCHANDISING RACK

FIELD OF THE INVENTION

The present invention is directed generally to a merchandising rack assembly. More particularly, the present invention is directed to a merchandising rack assembly for consumer goods. Most specifically, the present invention is directed to a cigarette carton merchandising rack assembly. A plurality of uprights are joined together by tie braces and base plates to form a rack module. A plurality of shelves are attached to the uprights and provide support surfaces for displaying and providing access to goods such as cartons of cigarettes. Each rack module is usable by itself or can be combined with other similar racks to provide an assembly of racks which can be configured in accordance with capacity requirements and floor space availability. The base of each rack module either has support feet which include level adjustments or alternatively can be provided with caster wheels to allow the rack to be moveably positioned within the selling area. Ease of assembly, flexibility, simplicity, and durability as well as the ability to form numerous spatial configurations are provided by the merchandising rack assembly in accordance with the present invention.

DESCRIPTION OF THE PRIOR ART

The attractive yet functional display and storage of consumer goods in a retail store is important for successful selling of a product. When the product being sold is one in which the consumer is offered a wide choice of generally similar products, numerous ones of which may be manufactured and distributed by a single supplier, the provision of a display and storage device which organizes the products and presents them in an appealing and orderly manner is of the upmost importance. For instance, in the retail selling of carton cigarettes, one manufacturer typically makes and sells a substantial variety of brands, each of which may come in one or more lengths, may be filtered or non-filtered and may include a mentholated version. The consumer is accordingly presented with a wide range of alternatives to select from. If the various brands are displayed and presented in an organized manner, consumer ease of selection will be facilitated and sales of the manufacturer's product lines will be enhanced.

Too frequently, the retail store does not have rack or support assemblies which are intended specifically for use with a certain type of product such as cartons of cigarettes. The racks and shelving units in a typical supermarket are intended to accommodate general merchandise and are not well suited for use with cartons of cigarettes. Often the responsibility for the provision of suitable racks and shelves is left with the cigarette manufacturer or his distributor.

A number of rack assemblies are generally known in the prior art. These range from rudimentary wooden shelves to exceedingly complex structures. Obviously, neither of these are appropriate for usage by the cigarette manufacturer or his distributor to display and store cartons of cigarettes. The racks in accordance with the prior art are either assembled in place and once assembled cannot be changed or altered, or are constructed at a remote location and brought to the point of use in their assembled configuration. In either situation little or no flexibility is provided.

In a retail store such as a modern supermarket or drug store, the amount of floor or display space allotted to a product is determined by the product's sales volume. If the product is not displayed in an attractive and appealing manner, its sales will suffer and its proportion of the selling space will be reduced. Present rack assemblies do not lend themselves to the display and sales of cartons of cigarettes due to their size and inflexibility. A retailer is thus apt to devote only a small portion of his selling space to these racks.

An important consideration in the structuring of a merchandising rack assembly should be its ability to adapt to changing selling space criteria and to shifts in product placement within a store. The prior art rack assemblies are apt not to be readily adaptable to various store layouts and produce shifts. Each rack is built as a unit whose overall size is not quickly varied and whose ability to cooperate with either other similar units or with previously installed units of various other types is drastically limited.

Presently available merchandising racks and shelves are often not particularly stable structures and are prone to sag and come unassembled. The use of these presently available rack assemblies is not satisfactory since the retailer may well be concerned with their ability to function properly. A sales display rack which does not show the cartons of cigarettes in an advantageous manner will not be apt to generate the sales volume required to demand the proper exposure necessary for a profitable operation.

Presently available carton cigarette display and merchandising racks are not particularly satisfactory for the various reasons set forth above. The rack assemblies are either not structured for this type of usage, are not adaptable to varying floor space arrangements and configurations, are not usable with other merchandising racks of diverse structure and are generally unattractive and unappealing. Thus the need exists for a cigarette carton merchandising rack which overcomes the shortcomings of the prior art devices.

SUMMARY OF THE INVENTION

It is an object of the present invention to provide a merchandising rack.

Another object of the present invention is to provide a cigarette carton merchandising rack module usable with other similar rack modules to form a merchandising rack assembly.

Yet another object of the present invention is to provide a cigarette carton merchandising rack module adaptable for use in various configurations.

Still a further object of the present invention is to provide a cigarette carton merchandising rack having means for connecting various rack forming components together.

Yet still another object of the present invention is to provide a carton cigarette merchandising rack which is provided with leveling means.

A still further object of the present invention is to provide a cigarette carton merchandising rack adaptable to be moved about the selling area.

An additional object of the present invention is to provide a cigarette carton merchandising rack assembly which can interface in down line situations with a broad range of shelf gondolas of variable and often unknown dimensions.

As will be set forth in greater detail in the description of the preferred embodiment, the cigarette carton merchandising rack module in accordance with the present invention is comprised generally of a plurality of upright members that are joined together by generally horizontally extending tie braces and base plates. The uprights have a plurality of slots which receive cooperating tabs on the tie braces and base plates. Various locking means are provided to join the uprights, tie braces, and base plates together. A plurality of shelves are securable between the various uprights and support the cartons of cigarettes. Each of the racks can be joined to other similar racks in a variety of arrays thereby allowing full utilization of the floor space in the selling area. The lower portion of each rack is supported by leveling means to facilitate the proper placement of the racks. Alternatively, a plurality of caster wheels can be attached to the base of each rack to provide a carton cigarette merchandiser that can be rolled about the sales area and placed in a prominent location. Price ticket supporting and covering means are provided for each of the shelves.

The cigarette carton merchandising rack in accordance with the present invention is functional, neat appearing, and is intended particularly for the display and sales of cartons of cigarettes. The rack's shelves are adjustably supported by the spaced uprights and are dimensioned so that they will hold cartons of cigarettes without wasting space. Thus instead of being an all purpose rack which can be made to serve as a cigarette carton support structure, the rack assembly of the present invention is structured primarily for its intended usage.

Each rack is assembled using only a limited number of component parts and without the necessity of using complicated proceedures or expensive tools. A supplier or distributor of cartons of cigarettes, who is apt to be relied on to provide the rack to support his products, can quite readily transport and erect the rack assembly in accordance with the present invention. This characteristic of the cigarette carton merchandising rack insures that the seller's products will enjoy a favorable store placement and hence a high sales volume.

Should the general arrangement of a particular store vary, or should the retailer want to rearrange his store, the cigarette carton merchandising rack of the present invention can be readily restructured or recombined to accommodate such changes. Each rack module can be joined to one or more similar racks in a number of orientations. Since the base portion of each rack is individually adjustable, each rack can be raised or lowered to align with adjacent racks. By attachment of the caster wheels to the bases of the racks, they can be quickly placed in different locations within the store.

The tie braces and base plates are connected to the slotted uprights in a secure manner to provide stable merchandising racks which present a finished appearance. As such they attract the potential purchaser and afford him the opportunity to select the product he wants. In contrast to the prior art devices, the cigarette carton merchandising racks in accordance with the present invention enhance the product, display it to its best advantage, make optimum use of floor space allocations, increase product sales, and provide the flexibility to adapt the cigarette merchandising rack to various sales and space requirements.

BRIEF DESCRIPTION OF THE DRAWINGS

While the novel features of the cigarette carton merchandising rack in accordance with the present invention are set forth with particularity in the appended claims, a full and complete understanding of the invention may be had by referring to the detailed description of a preferred embodiment as set forth hereinafter and as may be seen in the accompanying drawings in which:

FIG. 3 is a perspective view of a slotted upright member in accordance with the present invention;

FIG. 4 is a perspective view of a tie brace which cooperates with a slotted upright member;

FIG. 5 is a perspective view of a base plate of the present invention;

FIG. 6 is a perspective view of a connector clip usable to join adjacent upright members to each other;

FIG. 7 is a side elevation view, partly in section of a cam lock portion of a tie brace;

FIG. 8 is a cross-section view of the cam lock of FIG. 7, taken along line 8—8 in FIG. 7;

DESCRIPTION OF THE PREFERRED EMBODIMENT

Figure 1:
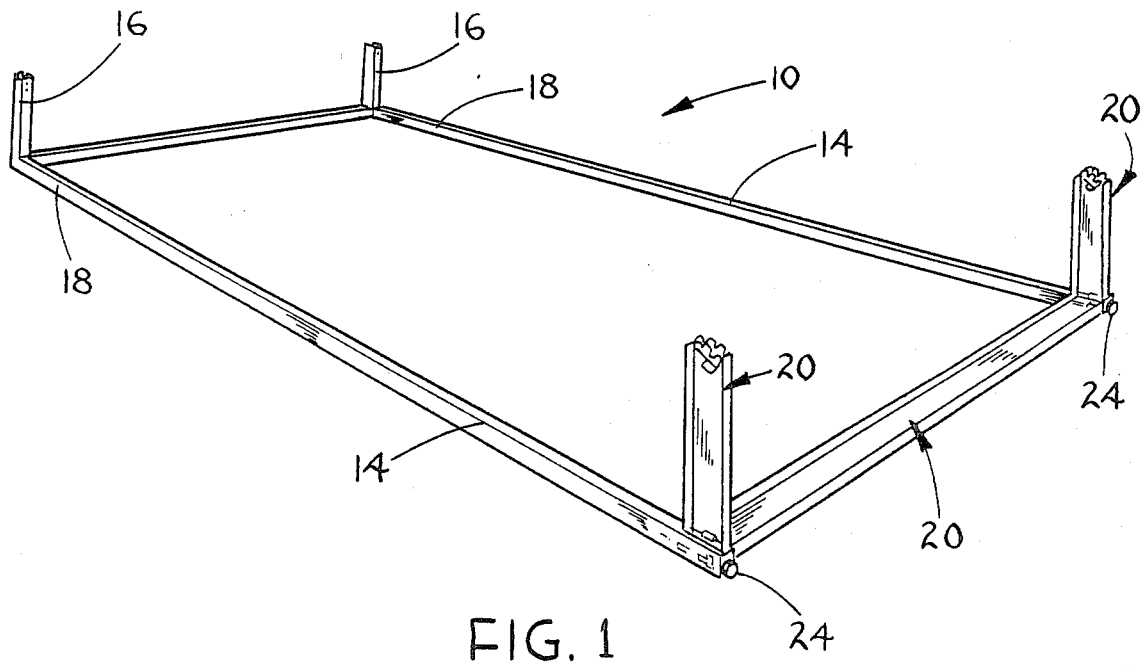
FIG. 1 is a perspective view of a partially assembled merchandising rack module in accordance with the present invention and showing various ones of the rack forming components.
Figure 2:
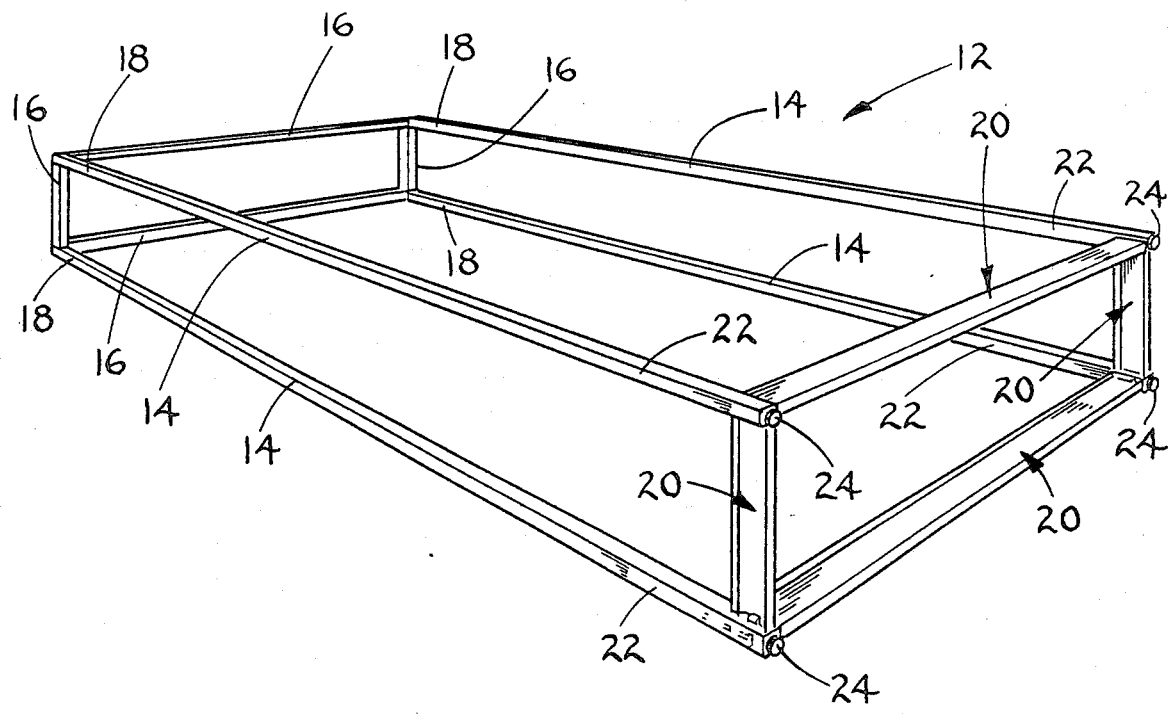
FIG. 2 is perspective view of an assembled rack module prior to its placement in its vertical use position.
Figure 12:
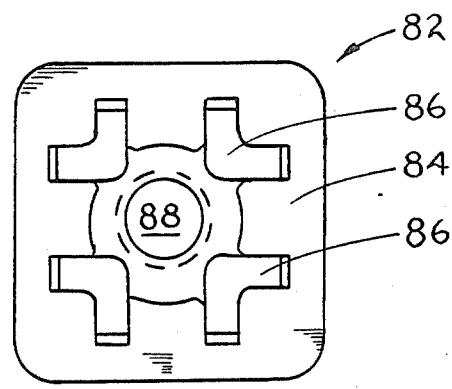
FIG. 12 is an end view of the leveler socket of FIG. 11.
Figure 13:
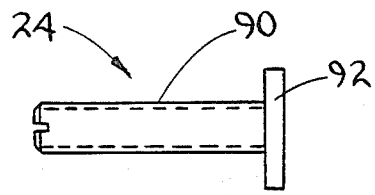
FIG. 13 is a side view of a support foot for use with the leveler socket shown in FIGS. 11 and 12.
Figure 14:
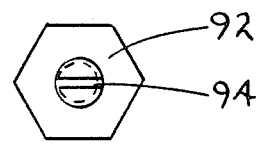
FIG. 14 is an end view of a support foot for use with the leveler socket shown in FIGS. 11 and 12.

Referring initially to FIGS. 1 and 2 there may be seen generally at 10 in FIG. 1, and 12 in FIG. 2 a partially and a completely assembled merchandising rack module, without shelving, in accordance with the present invention. The merchandising rack module shown in FIGS. 1 and 2 is structured utilizing four spaced uprights 14 which are combined with four tie braces 16 at their upper ends 18 and with four base plates 20 at their lower ends 22. As seen in FIGS. 1 and 2, each of the partially and completely assembled merchandising rack modules is generally rectangular. While module 12 is shown on its side in FIG. 2, it will be understood that upon completion of the assembly of rack module 12, it will be placed on support feet 24 so that the uprights 14 will be generally vertical. As will be evident from FIGS. 1 and 2, the actual dimensions of the assembled merchandising rack module 12 can vary. In the preferred embodiment, each upright 14 has a length of 70.5 inches, the shorter tie braces 16 and base plates 20 have lengths of 10.72 inches and the longer tie braces 16 and base plates 20 have lengths of 35.88 inches. Thus the assembled merchandising rack module 12 in accordance with the present invention is generally 6 feet high, 1 foot wide, and 3 feet long.

As was discussed previously, one of the advantages afforded by the merchandising rack in accordance with the present invention is the flexibility that it provides. Each rack module 12 can be attached to various other modules to form a merchandising rack assembly that is, in effect, tailor made for the space which the retailer has for it. Since the various arrangements of individual merchandising rack modules 12 to form a merchandising rack assembly is essentially limited only by the retailer's floor space, no attempt will be made in this application to detail possible rack assembly configurations. It is to be understood, however, that the flexibility to make numerous rack assemblies is one of the important aspects of the merchandising rack assembly in accordance with the present invention.

Each slotted upright 14 is, as may be seen more clearly in FIG. 4, a generally rectangular hollow tube whose wall surfaces 26 are provided with a plurality of generally rectangular, spaced slots 28. It will also be noted that slots 30 and 32 in the upper and lower ends 18 and 22, respectively of upright 14 are generally T-shaped. These T-shaped slots 30 and 32 facilitate the locking cooperation of the uprights and the tie braces 16 and base plates 20 as will now be discussed. Each end of each tie brace 16 includes, as seen in FIG. 4, a pair of spaced generally T-shaped tabs 34. During assembly, the lower tab 34 on one end of tie brace 16 is inserted in the upper portion of the T-shaped slot 30 in upright 16 and is slid downwardly, as may be seen more clearly in FIG. 9. Since the head of the T-shaped tab 34 is larger than the leg of the T-shaped slot 30, the tie brace 16 cannot be pulled directly out of upright 14. The upper T-shaped tab 34 on tie brace 16 rests in the bottom of the partial slot 36 provided at the top of upright 14.

Figure 9:
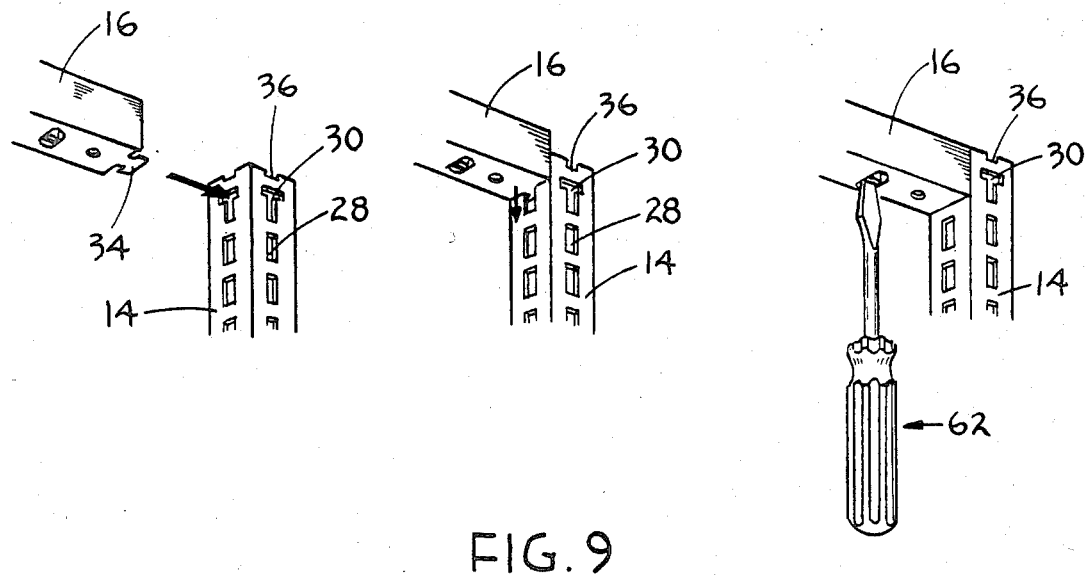
FIG. 9 is an assembly sequence showing securement of a tie brace to an upright.

As seen in FIG. 4, and as shown more clearly in FIGS. 7 and 8, a cam lock assembly, generally at 40, is provided in each end of each tie brace 16. An elongated locking blade 42 having a tapered, slot engaging head 44 at a first end is slidably positioned within an inner sleeve 46 that is telescoped within hollow tie brace 16. Inner sleeve 46 is provided with a latching lug 48 which is received in an aperture 50 in tie brace 16. A cam lock actuator rod 52 passes through a journal 54 in a second end of locking blade 42 and is provided with an offset central portion 56 that contacts blade journal 54, as seen in FIG. 8. A slot 58 is provided in each head portion 60 of cam locking blade actuator rod 52. As may be seen in FIG. 9, the blade portion of a screwdriver 62 can be placed in slot 58 in the cam actuator rod's head 60 and rotated. This rotates offset 56 and causes the head 44 of blade 42 to extend into the T-shaped slot 30 in the upper end 18 of upright 14, as seen in FIG. 9. This prevents the tie brace 16 from being able to move upwardly thereby preventing T-shaped tab 34 from becoming disengaged from T-shaped slot 30.

Figure 10:
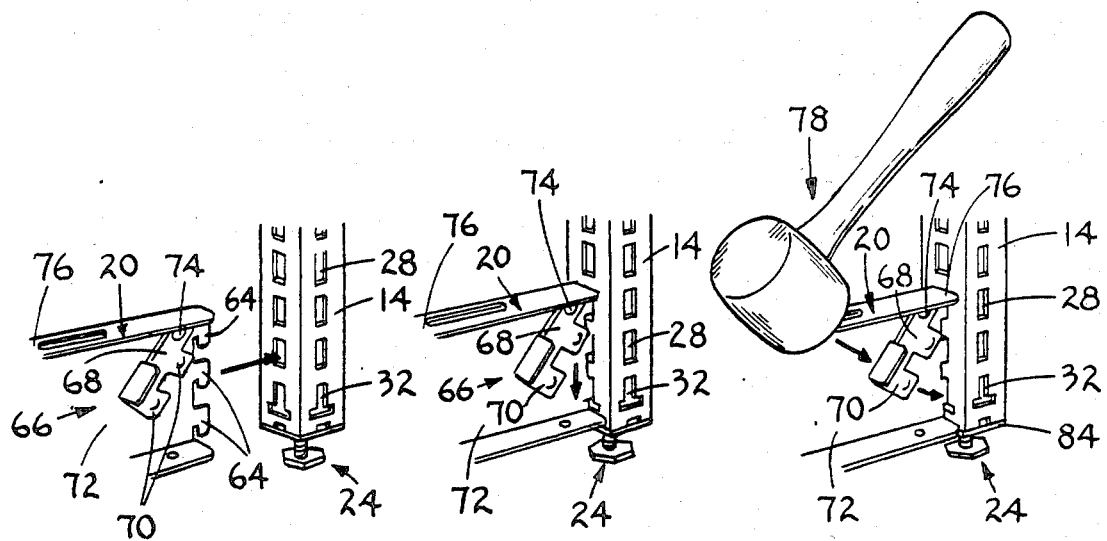
FIG. 10 is an assembly sequence showing attachment of a base plate to an upright member.

Each end of each base plate 20 is provided with three spaced hooks 64, as may be seen in FIGS. 5 and 10. These three hooks 64 are receivable in the three lowermost slots 28 and 32 in each upright 14, as is shown in the assembly sequence show in FIG. 10. Once the hooks 64 have been placed in the slots 28 and 32, the base plate 20 is lowered into position. A locking key, generally at 66, is attached to each end of each base plate 20. Locking key has a generally planar body 68 that is provided with a pair of locking tabs 70. Locking key 66 is pivotably attached to the web portion 72 of base plate 20 by a pivot pin 74 which is passed through base plate web 72 just beneath an upper flange 76 of base plate 20 which, as seen in FIGS. 5 and 10, is generally channel shaped. Once the three hooks 64 on base plate 20 have been inserted in the three slots 28 and 32 in upright 14, a hammer 78 can be used to apply force to a driving surface portion 80 of locking key 66. This causes the locking tabs 70 to also be received in slots 28 and 32.

The locking tabs 70 are dimensioned having a height generally the same as the height of the slots 28 and 32 thus preventing upward movement of base plate 20 as long as locking tabs 70 are in the slots.

Figure 11:
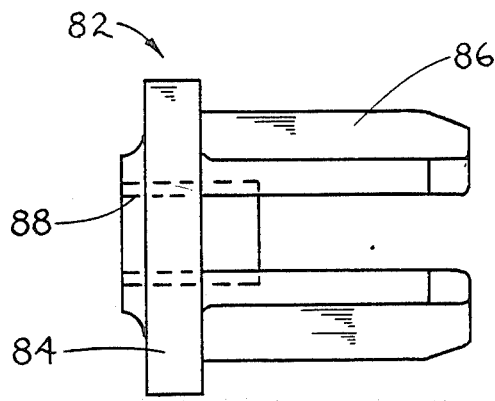
FIG. 11 is a side view of a leveler socket in accordance with the present invention.

As seen most clearly in FIG. 10, the lower end 22 of each upright 16 includes a support foot 24, as was mentioned previously. A leveler socket, generally at 82 in FIGS. 11 and 12 has a planar end 84 and four spaced tube engaging legs 86. These four legs 86 have a composite outer dimension equal to, or slightly larger than the inner dimension of the hollow rectangular upright 14. In use, the leveler socket's legs 86 are placed within the lower end of upright 14 and are forced into the upright 14 until the planar end 84 of the leveler socket contacts the lower end 22 of upright 14, as seen in FIG. 10. Planar end 84 of leveler socket 82 includes a central threaded aperture 88 which receives the threaded shank 90 of support foot 24. Shank 90 terminates in an enlarged head 92 that includes a slot 94 which will accept the blade of a screw driver. Head 92 is preferably six sided, and can be engaged by a conventional open ended wrench for turning. It is this flat enlarged head 92 that actually functions as the support foot 24 for each upright 14. It will be understood that rotation of threaded shank 90 in threaded aperture 88 in leveler socket 82 will effectively operate to adjust the height of uprights 14 and hence will provide a means for adjusting the merchandising rack module so that it will be level independent of the floor upon which it has been placed.

Figure 15:
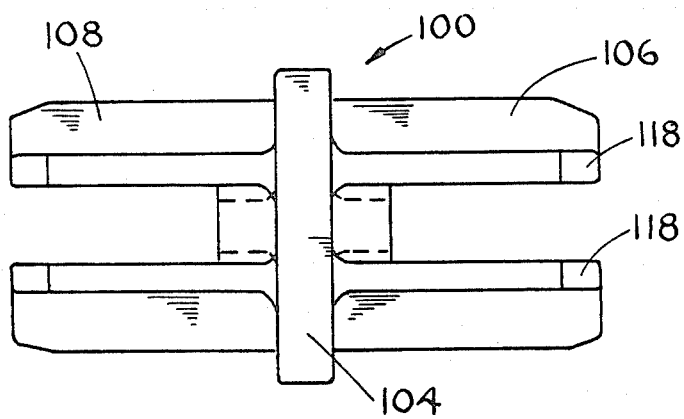
FIG. 15 is a side view of an upright tube connector in accordance with the present invention.
Figure 16:
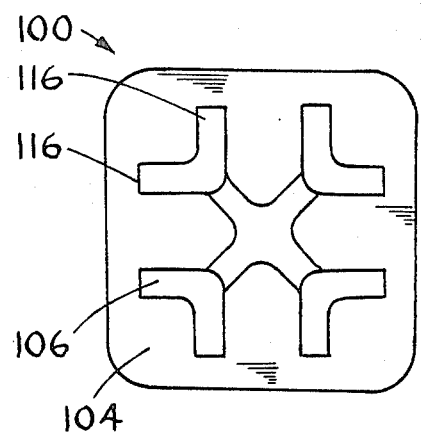
FIG. 16 is an end view of the tube connector of FIG. 15.
Figure 17:
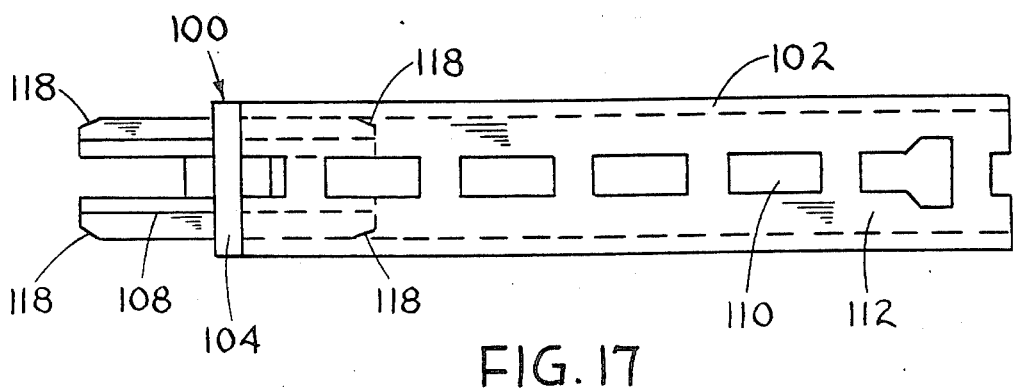
FIG. 17 is a side elevation view of one end of an extension upright tube showing the tube connector in place.

In some instances, it may be necessary to extend one of the upright members 14 such as, for instance, when a taller than standard merchandising rack assembly is to be provided. This can be accomplished in accordance with the present invention through the use of an upright tube connector, generally at 100 in FIGS. 15 and 16 in conjunction with an extension tube 102, as seen in FIG. 17. Upright tube connector 100 includes a central, generally rectangular, body 104 from opposed sides of which extend spaced leg members 106 and 108. These legs are generally the same as legs 86 for leveler socket 82 and each leg group defines a composite circumferential dimension equal to or slightly greater than the inner circumferential dimension of the upright member 14. The outer dimension of the central body 104 of tube connector 100 is the same as the outer dimensions of the upright member 14 and the similarly sized extension tube 102. As may be seen in FIG. 17, extension tube 102 is shown having the same general configuration as one of the upright members 14 to which it will be joined by upright tube connector 100. Extension tube 102 is generally rectangular, includes slots 110 in its wall surfaces 112, and ends in T-shaped slots 114 at its free end. In use, the legs 106 of tube connector 100 are inserted within extension tube 102. A seen in FIG. 16 each of these legs 106, 108 is generally V-shaped in cross-section and provides two bearing surfaces 116 which engage the inner walls of the extension tube 102. The free end of each of these legs 106, 108 includes an inwardly tapering surface 118. These tapered surfaces 118 reduce the effective size of the leading ends of legs 106 and facilitate the placement of these legs groups within the hollow extension tube 102 and the upright tube 14. In the preferred embodiment, the tube connector 100 is die cast zinc and forms a secure connection between the upright member 14 and the extension tube 102.

When more than one of the rack modules 12 are joined to each other to form a larger merchandising rack assembly, it is necessary to connect the individual racks 12 to each other. Their securement to each other may be accomplished by use of a connector clip 120, as seen in FIG. 6. Connector clip 120 includes a generally planar central web 122. Extending outwardly generally perpendicularly from central web 122 are two pairs of slot engaging fingers, an upper set of camming fingers 124, and a lower set of hooking fingers 126. In usage, the upper camming fingers 124 are inserted into the slots 28 in two adjacent uprights 15. The connector clamp 120 is then pivoted until the hooking fingers are received in two lower slots 28 in the adjacent uprights 14. Thus the connector clamp 120 joins the two uprights 14 together to join two adjacent merchandising rack modules 12 to each other in the formation of a merchandising rack assembly in accordance with the present invention.

Figure 18:
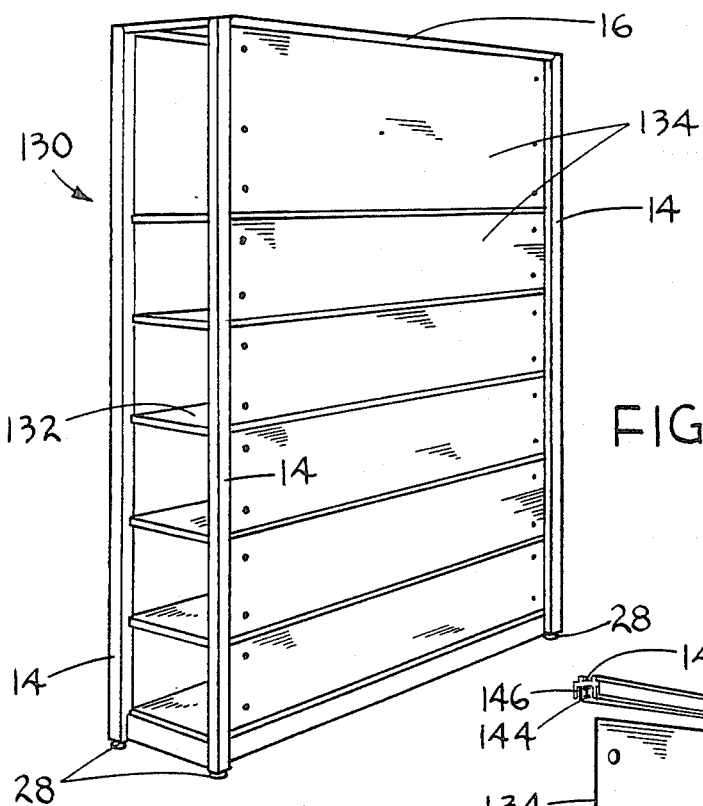
FIG. 18 is a rear perspective view of an assembled merchandising rack in accordance with the present invention and showing the utilization of rear shelf blocker panels.
Figures 19, 20:
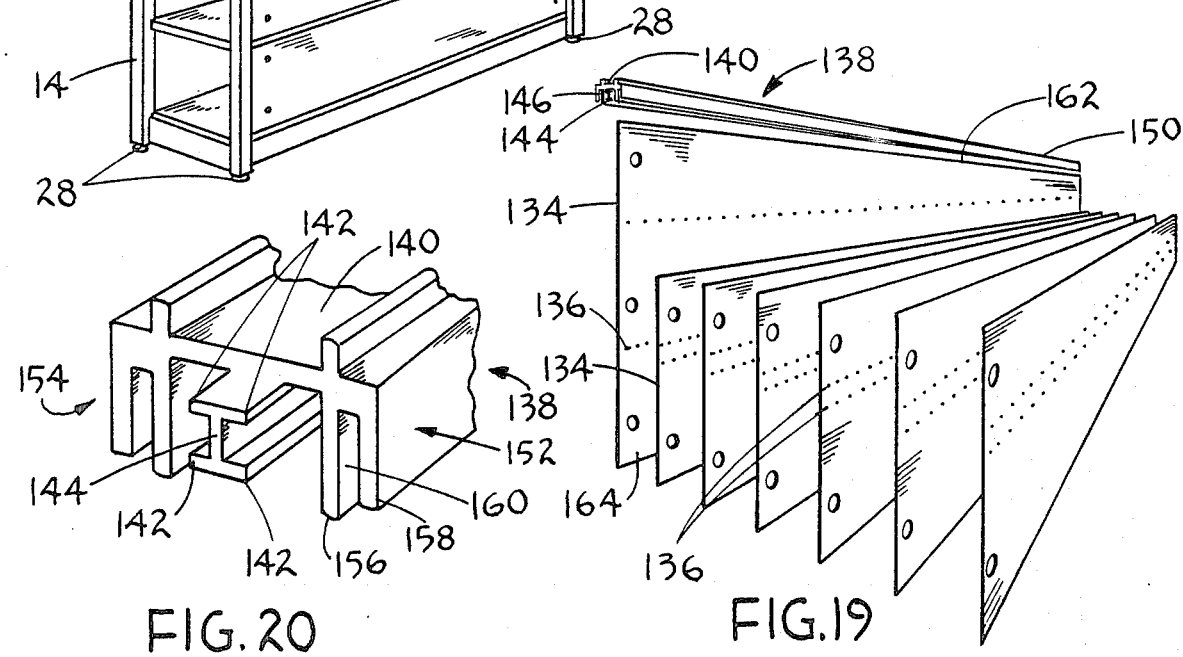
FIG. 19 is a perspective view of a plurality of rear shelf blocker channel panels.
FIG. 20 is a partial perspective view of an end portion of a blocker channel support.
Figure 21:
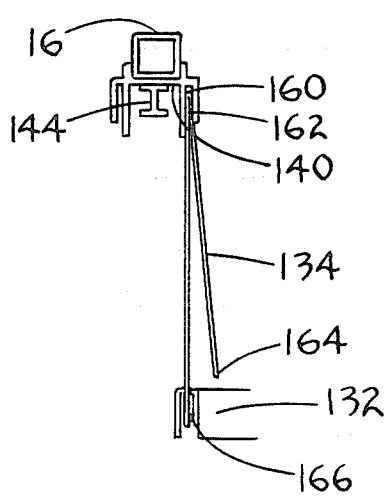
FIG. 21 is a side elevation view showing placement of a blockout panel between a blockout channel support and a shelf end.
Figure 22:
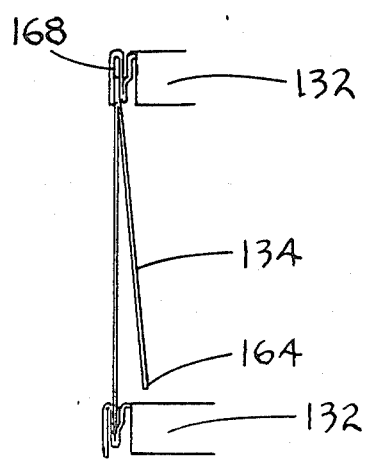
FIG. 22 is a side elevation view showing placement of a blockout panel between rear portions of two shelves.

Referring now to FIG. 18, there may be seen an assembled merchandising rack generally at 130 including a plurality of shelves generally at 132 and a plurality of rear shelf blockout panels 134. The merchandising rack 130 seen in FIG. 18 is shown in its usage position; i.e., with the uprights 14 generally vertical and with the rack 130 supported by its support feet 28. The rear blocker panels 134 shown in FIG. 18 and more clearly in FIG. 19 function to limit the rearward travel of cartons of cigarettes placed on shelves 132. As seen in FIG. 19, each of the blocker panels 134 includes lines of perforations 136 along which the blocker panels 134 can be divided to provide a height adjustment feature for these blocker panels 132. A blocker panel support channel, generally at 138, is shown in FIGS. 19 and 20. This support channel is a generally H-shaped plastic extrusion and, as seen in FIGS. 18 and 21, is structured to be positioned with its horizontal cross web 140 placed beneath a tie brace 16. Support channel 138 is held beneath the tie brace by retainer flanges 142 which extend outwardly as portions of a retainer rail 144 that is formed integrally with support channel 138. These rail flanges 142 are each positionable in a slot 28 in upright members 16. In use, one rail end 144 is positioned in a slot 28 in the inner side of a first rear upright 14 so that a first end 146 of the blocker panel support channel 138 is positioned adjacent the inner side of the first rear upright 14. The support channel is placed beneath tie brace 16 and a second rail end 144 is utilized to position a second end 150 of support channel 138 adjacent a second rear upright 14. Spaced vertical legs 152 and 154 of support channel 138 are, as seen most clearly in FIG. 20, comprised of spaced parallel webs 156 and 158 that cooperate to define a blocker panel receiving slot 160. These slots 160 are shown as facing downwardly, but it will be understood that they could be re-oriented to face upwardly if support channel 138 were placed atop tie brace 16. Alternatively, the support channel 138 could be provided with both upwardly and downwardly double spaced webs 156 and 158 to form a blocker panel support channel 138 which would operate to support the upper and lower edges of successive blocker panels. In use, as seen in FIG. 21, a blocker panel 134 is held in place at the rear of the merchandising rack 130 by insertion of an upper edge 162 of blocker panel 134 in blocker panel receiving slot 160. A lower edge 164 of blocker panel 134 is then placed in an inner receiving slot 166 at the rear of a shelf 132 placed below the blocker panel support channel 138. In a similar manner, a second blocker panel 134 can be placed between the rear portions of two shelves 132 by placement of an upper edge 162 of blocker panel 134 in an outer receiving slot 168 of the rear of the upper shelf 132 and by placing the lower edge 164 of the blocker panel 134 in the inner receiving slot 166 of the next below shelf 132.

Figure 23:
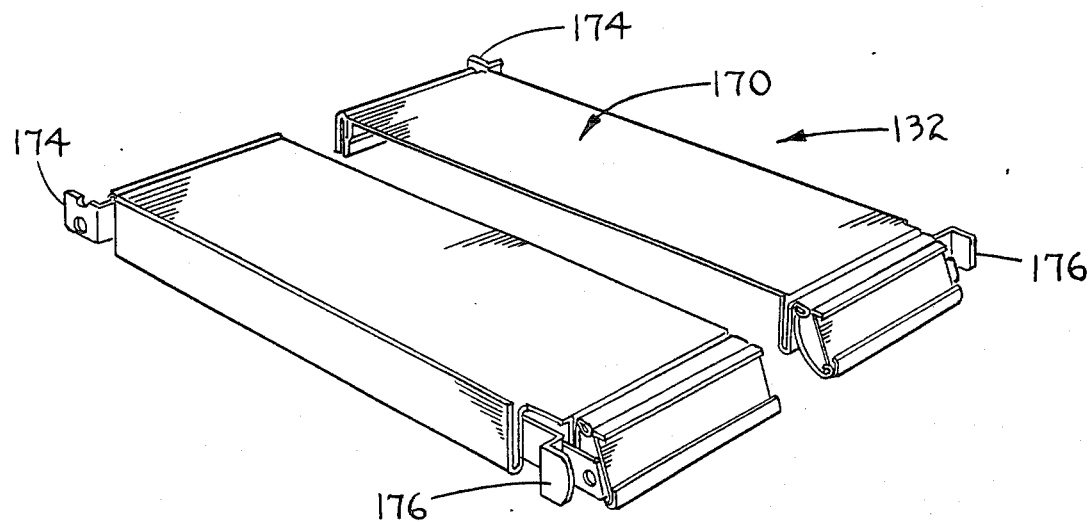
FIG. 23 is a perspective view of a shelf for use with the merchandising rack in accordance with the present invention.
Figure 24:
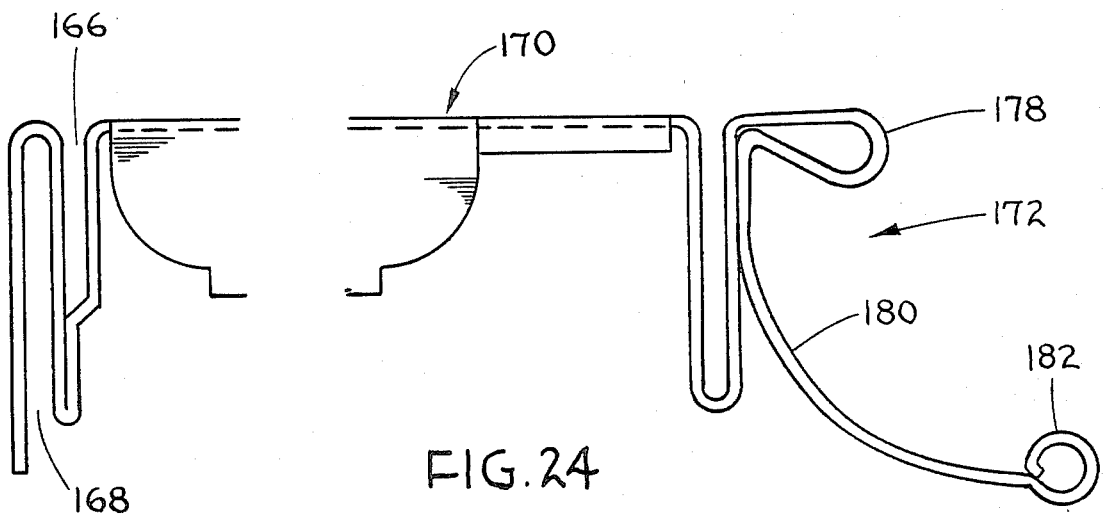
FIG. 24 is a side elevation view of a shelf pan portion of the shelf of FIG. 23 showing the blockout support and ticket snap on channel.
Figure 25:
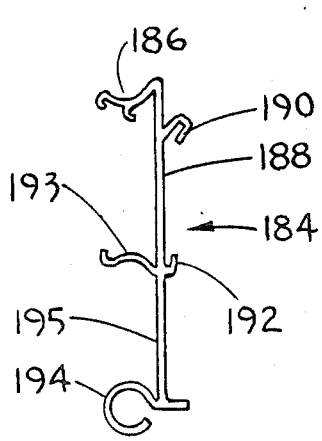
FIG. 25 is a side elevation view of a ticket cover assembly for use with the shelf pan of FIG. 24.

A shelf 132 is shown in more detail in FIGS. 23. While this shelf is set forth in greater detail in a patent application entitled "Adjustable Shelf Assembly", filed concurrently with the present application and assigned to the same assignee, shelf 132 includes a shelf pan 170 which includes the inner rear receiving slot 166 and the outer rear receiving slot 168 for blocker panels 134 as well as a ticket snap on channel generally at 172. Shelf 132 further includes rear fixed support ears 174 and front, spring biased support ears 176. These ears are sized to be receivable in slots 28 in the rear and front uprights 14, thereby adjustably positioning each shelf 132 in the assembled merchandising rack 130.

Ticket snap on channel 172 is formed as the leading edge of shelf pan 170 and includes a generally semi-circular elongated upper lip 178 that extends downwardly and outwardly in a curved web or flange 180 which terminates in a tubular lower lip 182. A cooperatively shaped cover assembly, generally at 184 is provided to cover and protect pricing tickets placed in ticket snap on channel 172 and held between upper lip 178 and lower lip 182. Cover 184 includes an upper concave flange 186, a generally planar support surface 188 having upper and lower support clips 190 and 192, respectively, a lower concave flange 193 positioned on the rear of support surface 188 generally opposite to lower support clip 192, and a lower resilient support clasp 194 formed at the lower end of a flexible web 195 which is formed as an integral part of cover assembly 184 and which depends downwardly from support surface 188. In usage, the lower resilient clasp portion 194 of cover assembly 184 is snapped over the tubular lower lip 182 of channel 172. Flexible web 195 then allows the cover assembly 184 to be bent over on itself so that upper concave flange 186 and lower concave flange 193 can be snapped into place between upper lip 178 and lower lip 182, respectively. Suitable price tickets and the like (not shown) that have been placed in ticket snap on channel 172 and are supported on curved web 182 between upper lip 178 and lower lip 182 are protected by cover assembly 184 which may itself carry decorative strips or the like between support clips 190 and 192.

Figure 26:
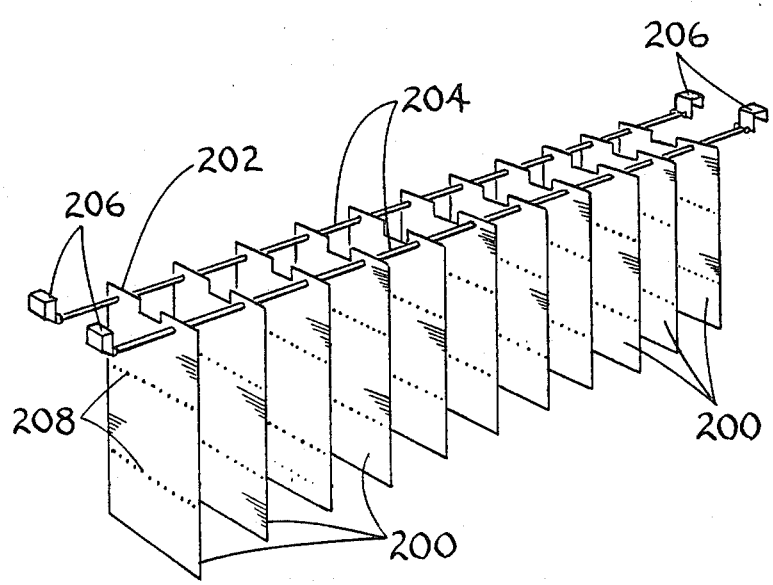
FIG. 26 is a perspective view of a carton row divider assembly for use with the merchandising rack in accordance with the present invention.

It may often be desirable to provide generally vertically oriented carton row dividers on the merchandising rack assembly 130. As may be seen in FIGS. 26, this can be accomplished through the use of a plurality of carton row dividing panels 200. Each carton row dividing panel 200 is suspended at its upper edge 202 by two spaced elongated carton row dividing panel support rods 204. Each of these rods 204 is telescopingly adjustable in length and carries tie brace engaging hooks 206 at either end so that the support rods 204 and hence the divider panels 200 can be supported above a desired shelf or shelves 132. As was the case with the blocker panels 134, the carton row divider panels 200 are provided with rows of perforations 208 which can be used to adjust the lengths of the divider panels in accordance with shelf spacing.

The merchandising rack assembly as described to this point has been set forth as a free standing assembly in which each of the support feet 24 was resting on a store floor with all of the support feet 24 being generally at the same level. While this is frequently the case, a number of situations exist in which the floor of the store includes relatively immovable down aisle support bases which typically are at a higher level than the rest of the store floor. Such a situation can be seen in FIGS. 27 and 28 in which the raised floor portion of the store is shown. In this situation, the base portion of the merchandising rack must be adapted to the uneven floor surface. This can be accomplished through the use of an adjusting assembly generally at 210 in FIGS. 27, 28, 32, and 33. As shown in FIGS. 27, 28, 32, and 33, a pair of telescopingly adjustable channel members 212, whose lengths are variable to support both single and double depth merchandising rack assemblies, carry generally triangular height adjustable support wedges 214 at a rear portion thereof. Each support wedge 214 has spaced, generally triangular support flanges 216 interconnected by a planar web. Each triangular support flange 216 has a scaled edge 217, and an elongated adjusting slot 218 which receives an adjusting bolt 220 that also passes through base channel 212. The planar web portion of each triangular height adjustable support wedge 214 includes an elongated tongue 222 that is received in a transverse aperture 224 in base channel member 212. As may be seen in FIGS. 27 and 28, the support wedges 214 are moved in a pivoting manner down into engagement with the raised floor surface by loosening of bolts 220 thus allowing the support flanges 216 to slide in elongated adjusting slots 218. Once the support wedges 214 have been positioned at their desired heights, the adjusting bolts 220 are tightened to hold the wedges 214 in place.

Figure 27:
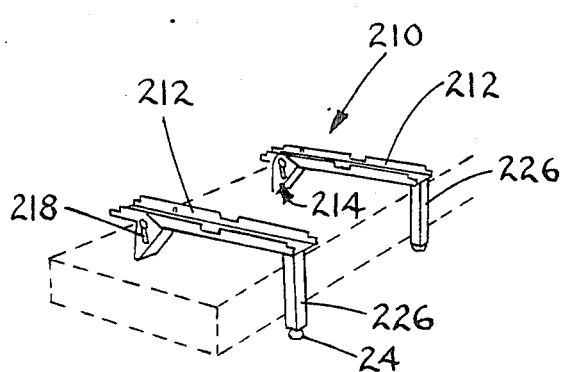
FIG. 27 is a perspective view of a height adjusting assembly for the merchandising rack and showing placement of the height adjusting assembly on an existing floor elevation.
Figure 28:
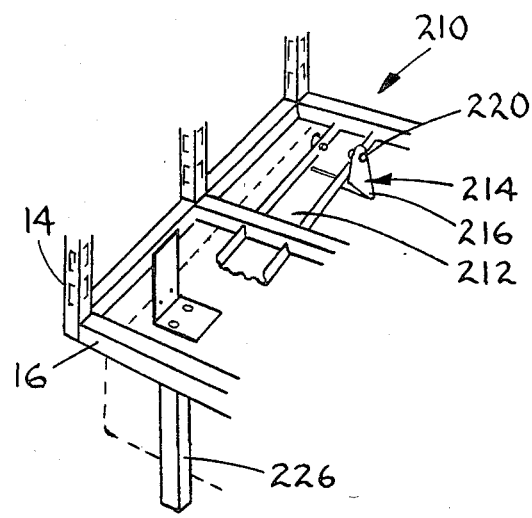
FIG. 28 is a perspective view of the height adjusting assembly in use with the merchandising rack.
Figure 29:
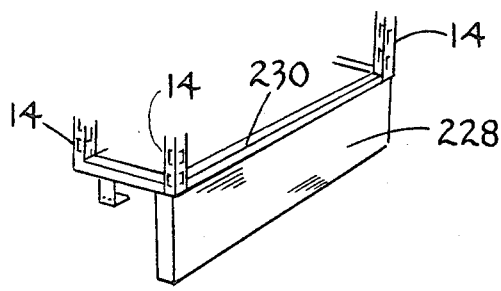
FIG. 29 is a perspective view of a portion of the height adjusting assembly and showing a base cover plate.
Figure 30:
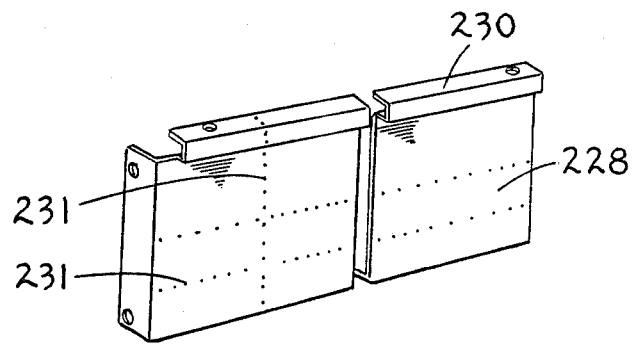
FIG. 30 is a perspective view of the base cover plate.
Figure 32:
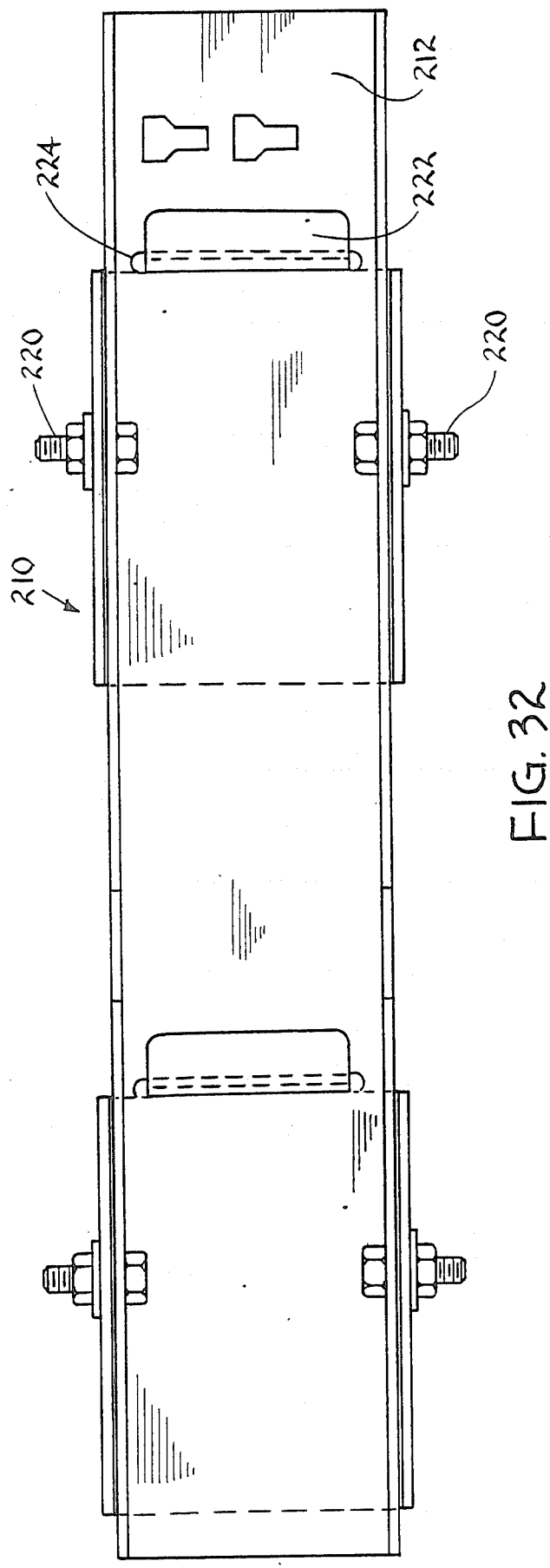
FIG. 32 is a top plan view of the height adjusting assembly of FIG. 27 in accordance with the present invention.
Figure 33:
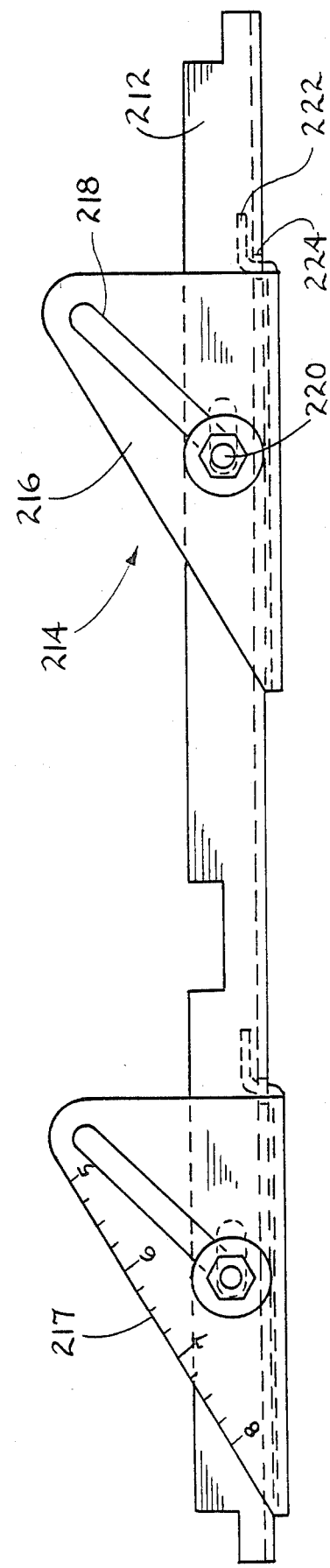
FIG. 33 is s side elevation view of the height adjusting assembly of FIG. 32.

In the support arrangement shown in FIGS. 27 and 29 the forward ends of the base channel members 212 are supported by short, adjustable uprights 226 having height adjustable support feet 24. As shown in FIGS. 28, tie braces 16 can be placed between the lower ends of the uprights 14 and the base channels 212 secured to the tie braces 16. Since tie braces 16 instead of base plates 20 are shown as being used at the lower portion of the merchandising rack shown in FIGS. 28 and 29, a base cover plate 228 is used to provide a finished appearance. This base cover plate 228 includes an upper mounting channel 230 which is attachable to the front tie brace, as seen in FIG. 29. Since the adjusting assembly 210 can be adjusted for both height and length variations, each base cover plate 228 is provided with lines of perforations or with break lines 231 in a manner similar to the shelf blocker panels. This allows the base cover plate 228 to be sized as required by a particular situation. It will be noted that each adjusting assembly 210 shown in FIGS. 27 and 28 includes only one set of triangular height adjusting support wedges 214 while the assembly 210 shown in FIGS. 32 and 33 shows two such wedges 214 but not the use of a forward short upright 226. This gives greater flexibility during installation by providing an adjustable support 210 usable in a number of situations. The support wedges 214 are easily relocated on the base channel member 212 by removal of adjusting bolts 220 and disengagement of tongue 222 from aperture 224. Similarly, the short uprights 226 can be attached to base support channel member 212 in any desired location. Thus the base of the merchandising rack can be adjusted or modified in accordance with the various floor configurations that may be encountered. Additionally, since the various gondola systems with which the merchandising rack assembly in accordance with the present invention must cooperate vary in both height and depth from store to store, the adjustable base assembly 210 provides the flexibility necessary to properly interface the present rack assembly with existing systems.

Figure 31:
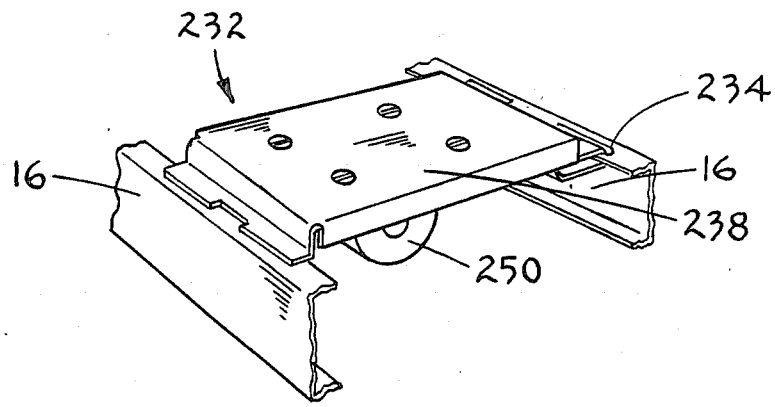
FIG. 31 is a perspective view of a caster wheel assembly attached to front and rear base plates of a merchandising rack in accordance with the present invention.
Figure 34:
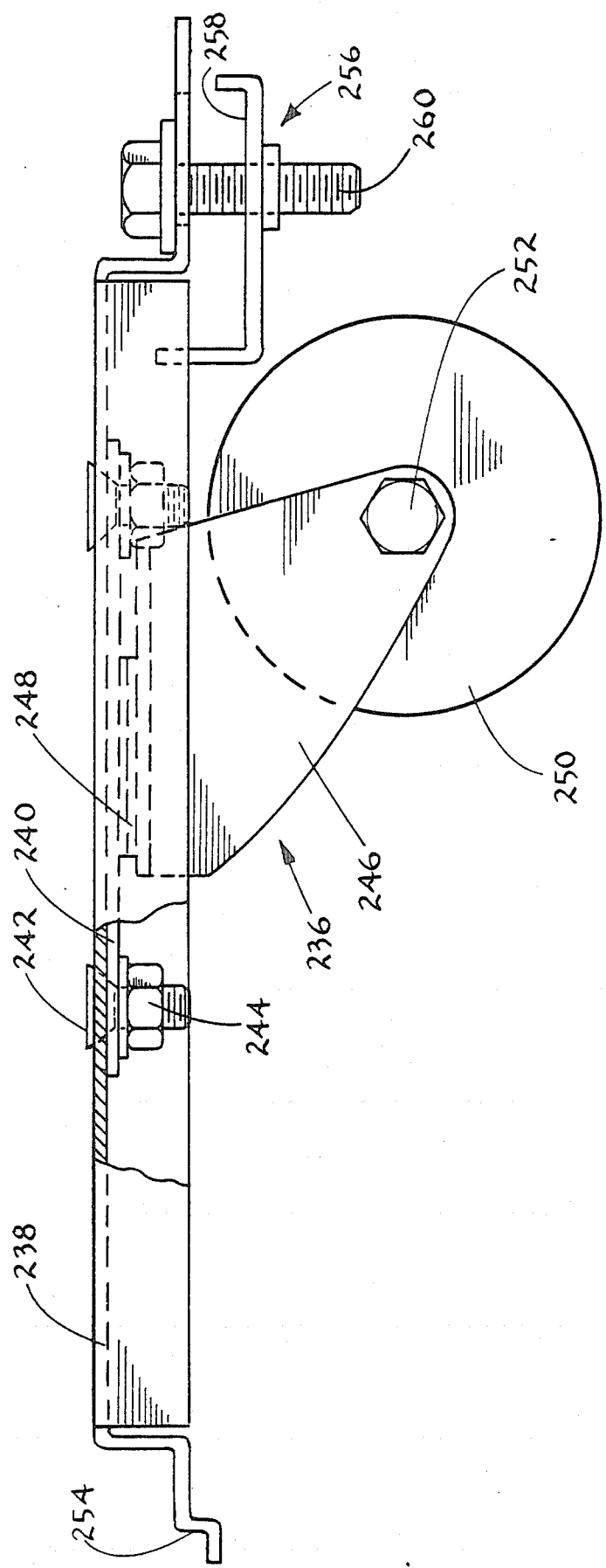
FIG. 34 is a side elevation view of the caster wheel assembly of FIG. 31.
Figure 35:
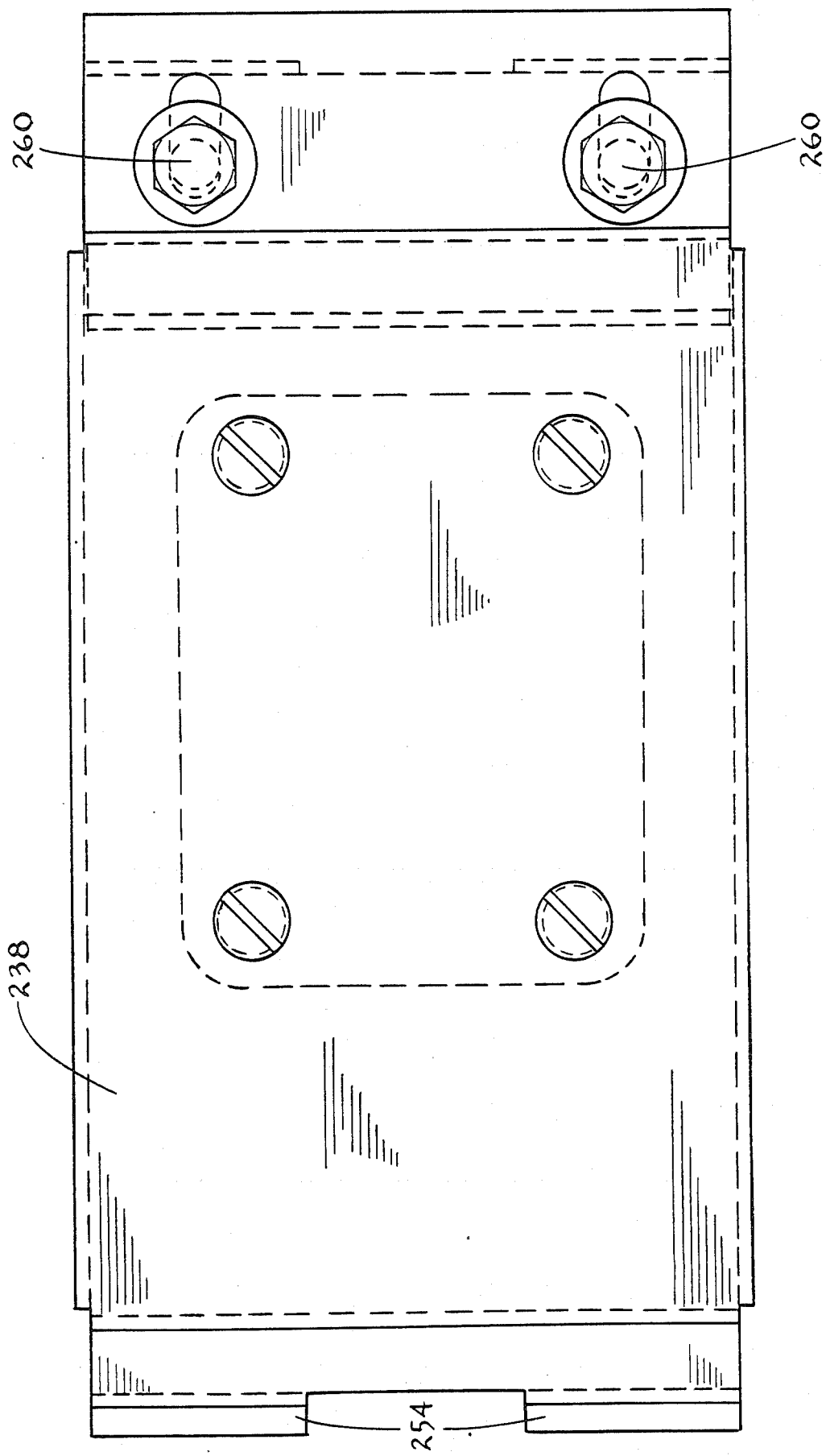
FIG. 35 is a top plan view of the caster wheel assembly.

A further variant of the merchandising rack module in accordance with the present invention is one in which the rack assembly is provided with caster wheels instead of the support feet or the height adjusting assemblies previously described. The use of caster wheels provides a merchandising rack which can be easily rolled from place to place within the retail store. This again affords the retailer a degree of flexibility not provided by prior art conventional fixed rack assemblies. In FIG. 31 there may be seen, generally at 232, a caster wheel assembly for use with a merchandising rack in accordance with the present invention. Caster wheel assembly 232 is supported between spaced tie braces 16 with the wheel assembly 232 being received in and secured to tie brace upper flange slots 234 which may also be seen in FIG. 5. As may be seen more clearly in FIGS. 34 and 35, caster wheel assembly 232 includes a caster wheel support frame 236 and a caster wheel mounting plate 238. Caster wheel support frame 236 includes a generally flat support plate 240 that is secured to caster wheel mounting plate 238 by suitable means such as bolts 242 and cooperating nuts 244. A generally U-shaped caster wheel swivel bracket 246 is affixed to the undersurface of caster wheel support plate 240 by a suitable swivel coupler 248. A caster wheel 250 is carried by an axle 252 between the arms of the caster wheel swivel bracket 246. Caster wheel mounting plate 238 is generally rectangular and includes a pair of tie brace flange slot engaging protrusions 254 at a first end, and tie brace flange slot engaging clamps 256 at a second, opposite end. Each of these clamps 256 has a clamp plate 256 carried by a clamp bolt 260. In use, the flange engaging protrusions 254 are slid into slots 234 in tie braces 16. The clamp bolts 260 are then tightened thereby elevating clamp plate 258 until it is received in tie brace flange slots 234 in the rear tie brace 16. Once in place, the caster wheel assembly 236 allows the merchandising rack to be freely moved. It is possible to use the caster wheels as permanent support or as temporary movement faciliating means. Since the various shelves 132 are easily removed and since the caster wheel assemblies 232 are readily attachable and removable, they can be used, if desired, to move the merchandising rack assembly from place to place and can be removed once the rack has been properly positioned. Probably more typically, the caster wheel assemblies will remain attached to the rack to function both as support means and movement facilitating means.

Each merchandising rack module generally as seen at 12 without shelves, and at 130 with shelves, is as was discussed previously, combinable with other rack modules to form a merchandising rack assembly whose overall configuration is determined in accordance with the available floor space. Rack modules can be joined to each other, they can be assembled in tandem or in groups in any direction, their support means can be varied to meet changing floor conditions, uprights can be lengthened, shelves can be raised and lowered, carton row divider panels and shelf blocker panels can be positioned and repositioned, and the racks can be rolled about the sales area, all in accordance with the present invention, to provide a cigarette carton merchandising rack assembly which is rugged, simple in structure, provides an orderly appearing display area, and which affords the desired flexibility necessary to appeal to both the store owner and to the customer thus resulting in a merchandising rack that will be placed in a high traffic area of the store and that generates maximum sales of the products displayed.

While a preferred embodiment of the cigarette carton merchandising rack assembly in accordance with the present invention has been fully and completely set forth hereinabove, it will be obvious to one of skill in the art that a number of changes in, for example, the over all size of each module, the shapes of the uprights and tie braces, the types of fasteners used, and the like could be made without departing from the true spirit and scope of the subject invention which is accordingly to be limited only by the following claims.

What is claimed is:

1. A merchandising rack module usable in displaying a plurality of cigarette cartons, said merchandising rack module comprising:
   a plurality of spaced, generally vertically oriented, hollow, uprights having a plurality of generally rectangular spaced slots in wall surfaces thereof;
   a plurality of elongate tie braces, each of said tie braces extending generally horizontally between two of said spaced uprights, each of said tie braces having a locking blade slidably carried in an inner sleeve positioned within said tie brace adjacent an end of said tie brace, each said locking blade having a locking blade head at a first end and being supported for movement with respect to said inner sleeve in said tie brace by a rotatable elongate locking blade actuator rod having a longitudinal axis perpindicular to the longitudinal axis of the tie brace, said actuator rod comprising an intermediate portion and two end portions, each of the portions having a substantially similar cross-sectional configuration, said intermediate portion of said actuator rod being offset from the longitudinal axis of said rod, the actuator rod further having slotted head portions positioned adjacent outer surfaces of said tie brace, said intermediate offset portion passing through a journal portion in a second end of said locking blade, rotation of said slotted head portion of said actuator rod causing said locking blade to slide with respect to said end of said tie brace and said upright, whereby each of said locking blade heads is insertable from said tie brace through one of said slots in one of said wall surfaces, each of said locking blade head receiving slots being T-shaped, each said tie brace further including at least one T-shaped tab at each end thereof, said at least one T-shaped tab being positionable within said T-shaped slot, said locking blade head being insertable within said T-shaped slot in conjunction with said T-shaped tab to lock said tie brace end in said upright;
   a plurality of base plates, each of said base plates extending generally horizontally between two of said uprights, said uprights, tie braces and base plates cooperating to define said merchandising rack module;
   a plurality of shelves removably secured and adjustably positioned between said plurality of uprights and providing support surfaces for the cartons of cigarettes; and
   means for separating and retaining cartons of cigarettes on said shelves.

2. The merchandising rack module of claim 1 wherein each of said base plates includes a generally vertical web portion.

3. The merchandising rack module of claim 2 wherein each end of said web of said base plate includes a plurality of said hook means which are generally coplanar with said base plate web.

4. The merchandising rack module of claim 3 wherein said hooks are receivable in adjacent ones of said slots in one of said uprights to connect an end of said base plate to said upright.

5. The merchandising rack module of claim 4 wherein each end of said base plate includes a locking key.

6. The merchandising rack module of claim 5 wherein said locking key includes locking tabs receivable in said slots of said upright which receive said base plate hooks.

7. The merchandising rack module of claim 5 wherein said locking key is pivotably secured to said web of said base plate adjacent an end of said base plate.

8. The merchandising rack module of claim 5 wherein said locking key includes a locking key driving surface, said driving surface being generally perpendicular to said base plate web.

9. The merchandising rack module of claim 1 wherein said means to support said merchandising rack module includes a support foot carried at a lower end of each of said uprights.

10. The merchandising rack module of claim 9 wherein said support foot includes a generally planar head integrally formed at a lower end of a threaded shank.

11. The merchandising rack module of claim 10 wherein said threaded shank is adjustably carried within a threaded aperture in a leveler socket positioned in the lower end of said upright.

12. The merchandising rack assembly of claim 1 wherein said means to retain said cartons on said shelves includes a plurality of rear shelf blocker panels supported at a rear portion of said rack module to limit rearward travel of said cartons placed on said shelves.

13. The merchandising rack module of claim 12 wherein a blocker panel support channel is secured between a pair of said spaced uprights and includes a blocker panel support slot.

14. The merchandising rack module of claim 13 wherein a rear portion of each said shelves includes an inner receiving slot and an outer receiving slot.

15. The merchandising rack module of claim 14 wherein a blocker panel is secured to said rack by placement of a top edge thereof in said blocker panel support slot and by placement of a bottom edge thereof in an inner receiving slot of a shelf.

16. The merchandising rack module of claim 1 wherein said means for separating said cartons on said shelves includes carton row dividing panels.

17. The merchandising rack module of claim 16 wherein each of said carton row dividing planels is slidably suspended at an upper end by spaced carton row dividing panel support rods.

18. The merchandising rack module of claim 17 wherein each of said support rods carries tie brace engaging hooks whereby said support rods are positionable above one of said shelves with said carton row dividing panels being generally perpendicular to said shelf and being spaced from each other and cooperating with said shelf to form carton receiving slots.

19. The merchandising support rack of claim 1 wherein said means to support said merchandising rack module includes an adjusting assembly usable to support said module on surfaces having varying elevations.

20. The merchandising rack module of claim 19 wherein said adjusting assembly includes at least one telescoping base channel member, each said base channel member including at least one triangular height adjustable support wedge.

21. The merchandising rack module of claim 20 wherein said triangular height adjustable support wedge is pivotably affixed to said base support channel and includes triangular support flanges having elongated adjusting slots.

22. The merchandising rack module of claim 21 wherein an elongated tongue of said triangular height adjustable support wedge is received in a transverse aperture in said base channel member.

23. The merchandising rack module of claim 21 wherein adjusting bolts are carried in said base channel member and pass through said elongated adjusting slots in said triangular support flanges.

24. The merchandising rack module of claim 1 wherein said means to support said merchandising rack module includes caster wheel assemblies secured between spaced base plates whereby said rack module is rollable.

25. The merchandising rack module of claim 24 wherein each said caster wheel assembly includes a swivel caster wheel carried by a caster wheel mounting plate.

26. The merchandising rack module of claim 25 wherein said caster wheel mounting plate includes a pair of protrusions at a first end, said protrustions being receivable in slots in upper flanges of said base plates.

27. The merchandising rack module of claim 26 wherein a pair of clamp plates are provided at a second end of said caster wheel mounting plate, said clamp plates engaging slots in upper flanges of said base plates spaced from said base plates which receive said protrusions.

28. The merchandising rack module of claim 1 wherein four of said uprights are interconnected at an upper end by four of said tie braces and at a lower end by four of said base plates to form a generally rectangular rack module.

29. The merchandising rack module of claim 1 wherein a plurality of said rack modules are interconnected to provide said merchandising rack assembly.

30. The merchandising rack module of claim 29 wherein connector clips insertable in said slotted uprights are said means used to interconnect said rack modules to form said merchandising rack assembly.

31. The merchandising rack assembly of claim 30 wherein each of said connector clips is generally channel shaped and has a central web and spaced outwardly extending camming fingers and hooking fingers.

32. A merchandising rack module usable in displaying a plurality of cigarette cartons, said merchandising rack module comprising:
   a plurality of spaced, generally vertically oriented, hollow, slotted, uprights;
   a plurality of tie braces, each of said tie braces extending generally horizontally between two of said spaced uprights, each of said tie braces including lock means for use in securement of ends of said tie braces to said uprights;
   a plurality of base plates, each of said base plates extending generally horizontally between two of said uprights, said uprights, tie braces and base plates cooperating to define said merchandising rack module;
   a plurality of shelves removably secured and adjustably positioned between said plurality of uprights and providing support surfaces for the cartons of cigarettes, a rear portion of each of said shelves having integrally formed thereon an inner vertical receiving slot and an outer vertical receiving slot; and
   means for separating and retaining cartons of cigarettes on said shelves, said means for retaining said cartons on said shelves including a plurality of rear shelf blocker panels supported at a rear portion of said rack module, each said blocker panel being secured to said rack by placement of a top edge thereof in a blocker panel support slot in a blocker panel support channel secured between a pair of said spaced uprights, and by placement of a bottom edge thereof in said inner vertical receiving slot of one of said shelves said outer vertical slot being capable of receiving the top edge of a rear blocker panel.

33. The merchandising rack module of claim 32 wherein a blocker panel is secured to said rack by placement of a top edge thereof in an outer securing slot on one shelf and by placement of a bottom edge thereof in an inner receiving slot of the next lower shelf.

34. The merchandising rack module of claim 32 wherein each of said rear shelf blocker panels includes tear lines whereby the height of each of said blocker panels can be reduced.

* * * * *